United States Patent [19]

Clement

[11] Patent Number: 4,503,920
[45] Date of Patent: Mar. 12, 1985

[54] MASONRY BIT

[76] Inventor: Burke Clement, 7823 Gleason Rd., Westview Towers, Apt. 1214, Knoxville, Tenn. 37919

[21] Appl. No.: 430,890

[22] Filed: Sep. 30, 1982

Related U.S. Application Data

[63] Continuation-in-part of Ser. No. 291,640, Aug. 10, 1981, Pat. No. 4,400,119.

[51] Int. Cl.³ ............................................. E21B 10/44
[52] U.S. Cl. .................................. 175/394; 175/410; 175/415
[58] Field of Search ............... 175/394, 395, 410, 415; 408/223, 230

[56] References Cited

U.S. PATENT DOCUMENTS

| 1,144,088 | 6/1915 | Ains | 408/223 X |
| 2,673,714 | 3/1954 | Hargrave | 175/394 |
| 3,674,101 | 7/1972 | Chromy | 175/410 X |

FOREIGN PATENT DOCUMENTS

| 349731 | 11/1920 | Fed. Rep. of Germany | 175/394 |
| 584358 | 9/1933 | Fed. Rep. of Germany | 175/410 |

Primary Examiner—Ernest R. Purser
Attorney, Agent, or Firm—Pitts, Ruderman & Kesterson

[57] ABSTRACT

An improved bit for use in drilling masonry and the like. This bit is of the type having a transverse bar of hardened material in the tip thereof with symmetrical end surfaces sloping away from a central chisel edge located on the axis of the bit. One of these surfaces is provided along its length with a groove extending from a cutting lip to the trailing edge, with the groove width and depth at the trailing edge having at least the same dimensions as at the cutting edge. Preferably the dimensions at the trailing edge are slightly greater than those at the cutting edge. The second of the surfaces has an outer portion with a reduced angle with respect to the axis of the bit as compared to the angle of the inner portion. This construction provides for the accurate drilling of holes in masonry and the like and further accomplishes the drilling at increased penetration rates with the same or lower axial force applied to the bit.

5 Claims, 3 Drawing Figures

MASONRY BIT

BACKGROUND ART

This is a continuation-in-part application to application Ser. No. 291,640 filed Aug. 10, 1981. The inventor of that application is Burke Clement, and the application is entitled "Improved Twist Drill". This application has matured into U.S. Pat. No. 4,400,119, issued Aug. 23, 1983.

TECHNICAL FIELD

This invention relates generally to rotary bits used for drilling into masonry and like material, and more particularly to a rotary masonry bit of the type having a transverse hard insert at the cutting tip. The improvement provides increased speed of penetration into the masonry at reduced axial pressures.

Numerous devices are utilized for producing substantially circular holes in masonry and like material. One such device is the "star drill" which is an elongated tool having a toughened star-shaped cutting end which is repeatedly driven against the masonry thereby causing the masonry immediately below the cutting end to become pulverized. This pulverized material may then be removed from the hole in any suitable manner as by a stream of air. More commonly, however, a rotary drill bit is utilized for preparing such holes in masonry. The most common of these masonry bits is shaped generally like a twist drill. A major difference exists in the cutting end in that a piece of hardened material, such as tungsten carbide, is inserted transversely across the cutting end of the drill bit and this hardened material carries the cutting lips of the drill. Conventionally the masonry bit has a pair of flutes extending the length of the drill to a point where a shank is formed for securing the bit in a rotary drive mechanism. The edges of the flutes (or lands) are normally dimensioned such that they do not contact the wall of a drill hole in order that a reduced friction between the drill and the wall hole is achieved. The flutes are utilized to withdraw cut material as the drill bit moves into the masonry. Because of the hardness of masonry (including rock, brick, etc.,) the drilling operation is normally quite slow, and rather high pressure must be exerted axially on the drill bit to accomplish the drilling. Further, the cutting lips gradually become rounded requiring a resharpening of the bit. Part of this rounding occurs because the insert reaches substantially high temperatures due to friction against the masonry material.

Although the cutting lips of a newly manufactured masonry bit are normally symmetrical, the symmetry may be destroyed when the cutting lips are restored as by grinding with an appropriate sharpening apparatus. When asymmetry occurs, the drill bit tends to move from an axial cutting position and wander from the axis of the desired hole. Furthermore, the cutting lip which performs the greatest amount of cutting from this non-symetrical shape is dulled more quickly and thus the drill bit requires more frequent sharpening.

Accordingly, it is one object of the present invention to provide a masonry bit for rotary operation which penetrates masonry at a higher rate with less pressure, and thus develops less heat, than drill bits of the prior art.

It is another object of the present invention to provide a rotary masonry bit which achieves cutting along a true axis of the desired hole in masonry.

It is also an object of the present invention to provide an improved masonry bit which requires less sharpening maintenance.

Other objects and advantages of the invention will become apparent upon reading the detailed description with reference to the drawings.

DISCLOSURE OF THE INVENTION

In accordance with the invention, a masonry drill bit is provided which accomplishes increased drilling speed and penetration into masonry at reduced axial pressures. Specifically, the improved masonry bit is of the type having a singular cutting bar of hardened material extending across the cutting end of the drill bit. This hardened bar carries a pair of generally symmetrical cutting lips on opposed portions which recede from a central chisel edge of the cutting bar. One of these portions, at a position substantially midway between a radial edge and the chisel edge, is provided with a groove extending from the cutting lip to the trailing edge of that portion of the cutting bar. The depth and width of the groove at the trailing edge is at least equal to or greater than the respective dimensions of the groove at the cutting lip.

BEST MODE FOR CARRYING OUT THE INVENTION

Figure 1:
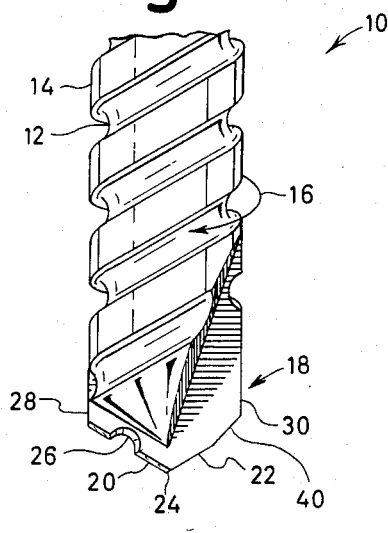
FIG. 1 is a partial elevational view of the present invention.

Referring to FIG. 1 shown therein generally at 10 is one embodiment of the present invention. A central shaft or web 12 supports at least one spiral flute having a land 14. When the drill bit 10 is rotated in a direction illustrated at 16, the upper edge of the flute carries away debris produced by the cutting into masonry in a conventional manner. Mounted in the end of the shaft 12 is a bar 18 of hardened material (typically silicon- or tungsten-carbide) which generally will withstand the wear of masonry materials. This bar 18 has a pair of forwardly extending surfaces 20, 22 which carry cutting lips on a forward edge, with respect to the direction of rotation, and which surfaces recede to a trailing edge. The surfaces 20, 22 join at a chisel edge 24 substantially on the axis of the shaft 12.

One of the surfaces (e.g. 20) of the bar 18 is provided with a groove 26 generally midway between the chisel edge 24 and the most radial edge 28 of surface 20. This radial edge 28, and a corresponding radial edge 30 of surface 22, extend radially from the axis of the drill bit a distance greater than the radial extremity of the land 14 as is common practice in masonry drill bits. The groove 26 may have a U-shaped cross-section, as shown, or may have other cross-sections such as a V-shape or a rectangular shape. The width and depth of the groove at the trailing edge of the surface 20 are at least equal to, but preferably greater than, the depth and width of the groove at the cutting edge.

In order that the surface (i.e. 20) containing the groove 26 always assumes the role of the leading cutting lip during drilling, the other surface 22 is modified as shown. Specifically, the surface 22 has an outer portion 40 that forms a reduced angle with respect to the axis of the drill bit. The length of this portion 40 is substantially equal to the spacing between the outer edge 42 (see FIG. 3) and the radial edge 28. Accordingly, the leading edge 32 (see FIG. 2) is always the leading cutting lip of the drill bit. More detail with regard to this construction will be described with reference to FIG. 3.

Figure 2:
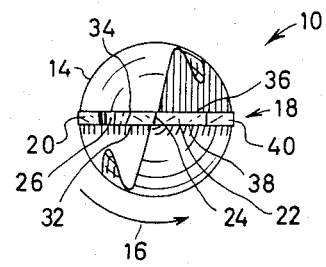
FIG. 2 is an end view of the drill bit shown in FIG. 1.

An end view of the masonry bit of the present invention is shown in FIG. 2. Identified therein are the end surfaces 20, 22 of the bar 18. It may be seen that surface 20 has a leading or cutting edge 32 and a trailing edge 34. Similarly surface 22 has a leading or cutting edge 36 and a trailing edge 38. The groove 26 in the surface 20 is shown in this view to have a greater width in the trailing edge 34 than in the cutting edge or cutting lip 32. This difference in dimension permits passage of material through the groove 26 without substantial wear upon the surface of the groove.

Figure 3:
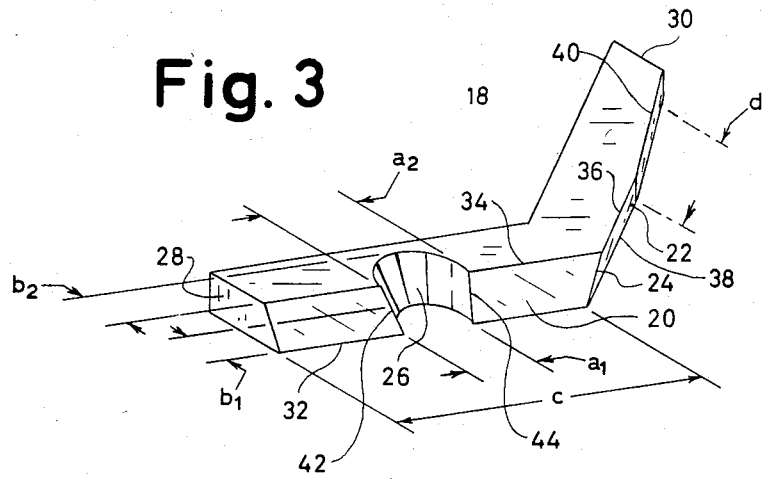
FIG. 3 is a perspective drawing of the hardened insert of the drill bit of the present invention enlarged over that shown in FIGS. 1 and 2.

A detailed perspective view of just the cutter bar 18 is shown in FIG. 3. The construction of the groove 26 and its respective dimensions are more clearly shown in this figure. For example, the dimension from the chisel edge 24 to the peripheral edge 28 of the surface 20 is designated as c. Generally midway in this length c is located the groove 26, shown again as a U-shaped groove. The width $a_1$ of the groove 26 at the cutting edge 32 is equal to or less than the width $a_2$ of the groove at the trailing edge 34. Similarly the depth of the groove at the cutting edge, which depth is designated as $b_1$, is equal to but preferably less than the depth $b_2$ at the trailing edge. Typically the groove 26 is about ⅛ to 3/16 inch wide and ⅛ to 3/16 inch deep when the length of the surface 20 is about ½ inch and the thickness of the insert is about ⅛ inch. Dimensions substantially less than these will not perform the desired function: a substantially greater proportionate dimension will reduce the cutting efficiency of the masonry bit.

Shown in FIG. 3 is an enlarged view of the bar 18. The surface 40 as associated with the surface 22 is more clearly seen therein. This surface at its outer end has a different angle with respect to the axis of the drill bit than does the surface 22. This surface 40 extends inwardly from the radial end 30 a distance d. This distance is substantially equal to the distance between the outermost edge 42 of the groove 26 and the radial edge 28 of the surface 20. In this construction, therefore, principle cutting surfaces occur from the radial edge 28 to the outer edge 42 of the groove 26, and from the inner edge 44 of the groove 26 to the central chisel edge 24. The cutting edge 38 to the beginning of the surface 40 then cuts material left by the groove 26.

The operation of the present invention, particularly with respect to the principle embodiment illustrated in the figures, is as follows. As the masonry bit is rotated in the direction shown, the material is cut by the cutting lips 36 and 32 except for the portion of the width of the groove 26 and along portion 40. As the bit is continued to be rotated, the cutting lip 36 removes any material which is bypassed by the groove 26, and cutting lip 32 removes material bypassed by portion 40. This type of cutting, as demonstrated by experimentation, brings about a penetration of masonry at a higher rate with less axial pressure upon the drill bit than a conventional masonry bit. Furthermore, the groove 26 permits an escape of material removed from the masonry whereby said material is captured by the upper edge of the flute for removal from the hole being drilled. The increased speed of penetration and the reduction of the required axial pressure upon the drill bit results in less wear upon the cutting surfaces and thereby necessitates less frequent resharpening of the cutting lips of the drill bit.

From the foregoing description it will be recognized that a drill bit for masonry and the like is provided which will produce a circular hole in the material and which provides for the removal of drilling debris more readily from the hole. Furthermore, this construction and the removal of the debris enhances the speed of drilling and reduces the axial force required to move the bit into material to be drilled.

It is of course understood that although a preferred embodiment of the present invention has been illustrated and described, various modifications thereof will become apparent to those skilled in the art. Accordingly, the scope of the invention should be defined only by the appended claims and the equivalence thereof.

I claim:

1. An improved masonry drill bit of the type wherein a transverse cutting bar is carried on an outer end of a shank and said shank is provided with at least one spiral flute, said cutter bar having a first and a further surface joined at a chisel edge on the axis of said shank, said first and further surface each having a cutting edge and a trailing edge, wherein the improvement comprises:
    providing in said first surface a groove extending from said cutting edge to said trailing edge, the width and depth of said groove at said trailing edge being at least equal to the width and depth of said groove at said cutting edge; and
    dividing said further surface into an inner radial portion and an outer radial portion, said outer radial portion beginning at a dimension equivalent to substantially that of a radial outer edge of said groove in said first surface, said outer radial portion forming an angle with respect to said axis of said shaft less than an angle of said inner radial portion with said axis.

2. The masonry drill bit of claim 1 wherein said groove is U-shaped.

3. The masonry drill bit of claim 1 wherein said groove is provided in said first surface substantially midway between said chisel edge and a radial extremity of said first surface.

4. The masonry bit of claim 1 wherein said width and depth of said groove at said trailing edge are greater than said width and depth of said groove at said cutting edge.

5. The masonry drill bit of claim 1 wherein said width and depth of said groove at said cutting edge are about ⅛ to 3/16 inch and ⅛ to 3/16 inch, respectively.

* * * * *